Figure 1:
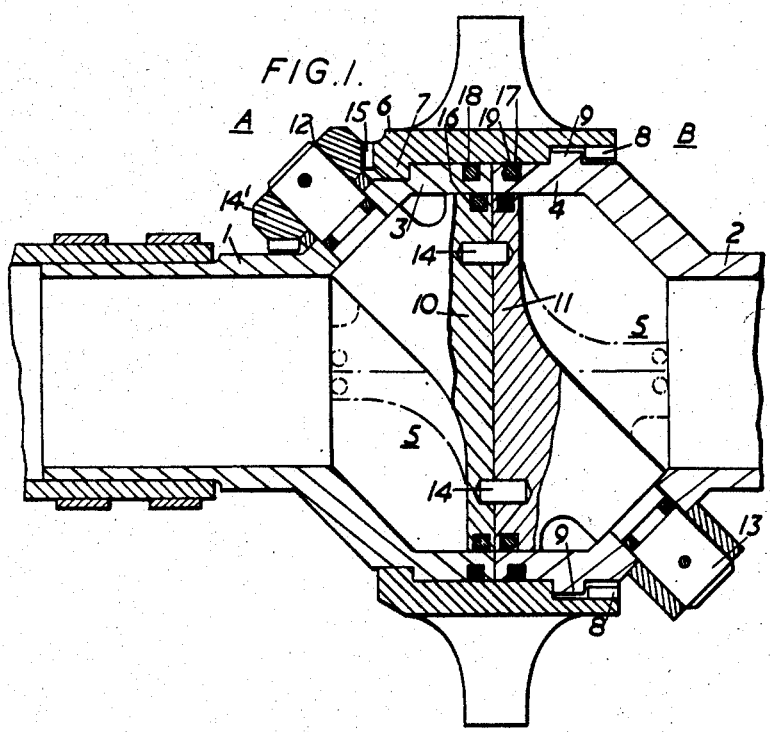

Oct. 8, 1963   H. C. COOPER   3,106,223
DISCONNECTABLE COUPLING
Filed Feb. 1, 1960   2 Sheets-Sheet 1

Inventor
Harry Christopher Cooper
By Baldwin & Wight
Attorneys

3,106,223
DISCONNECTABLE COUPLING
Harry Christopher Cooper, Crawley, England, assignor to The A.P.V. Company Limited, Crawley, England
Filed Feb. 1, 1960, Ser. No. 5,718
Claims priority, application Great Britain Feb. 2, 1959
1 Claim. (Cl. 137—614.01)

This invention relates to pipe closures of the kind employed to close the ends of one or other of both of two normally connected pipes and fittings when they are disconnected from one another, the operation of the closure being effected automatically by an act necessarily made in disconnecting the fittings from one another.

Various proposals have already been made to ensure that the action of effecting closure occurs as, or even before, the end fittings can be disconnected from one another.

The present invention has for its main object to provide an improved arrangement which shall be simple and shall not rely upon springs or other parts which require displacement at the time of disconnection under the action of the pressure of the fluid in the pipe line.

Broadly stated the present invention consists in providing at least one of the pipe end fittings with a closure valve which is so coupled to the operating means provided for connecting and releasing the end fittings to and from one another as to be moved automatically by that operating means into closing position as a preliminary step before the means achieves or permits separation.

In many cases it would be desirable to equip both end fittings with a closure valve which requires to be similarly operated: in order to ensure that there shall be no space between the two closure valves in which fluid can be held at the time of disconnecting the end fittings, the two valves are formed so as to abut face-to-face to provide virtually a single valve component, the conjoint component being moved by the operating means so that the one operation closes both pipe ends.

The two pipe end fittings are arranged to be released from one another (or drawn together) by the movement of any convenient mechanism but for the purpose of the present invention the initial part of that movement is, when the coupling is to be released, utilised to move the valve spindle close the valve without however producing any releasing action of the end fittings: thus it is ensured that the pipe end or ends are closed before they can commence to part, further movement of the mechanism being required to permit or cause separation to take place: most usually these mechanisms are in the form of interrupted rings or of bayonet and slot arrangement, both of which involve an angular movement; the initial part of that movement would be used for the purpose of the invention in operating the valve.

The converse operation will, of course, occur when the end fittings are presented for connection, i.e. the connection will first be secured and then the valve will be opened.

It may be desirable to provide a lock which will prevent the spindle of the valve or valves from being turned after the end fittings are disconnected: this could be provided by a locking pin which comes into position on separation of the fittings and locks the spindle or spindles until the fittings are again presented.

Figure 2:
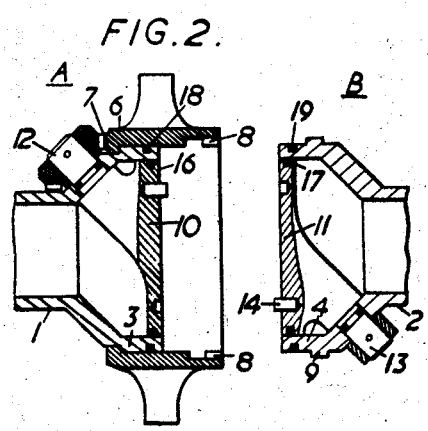
Figure 3:
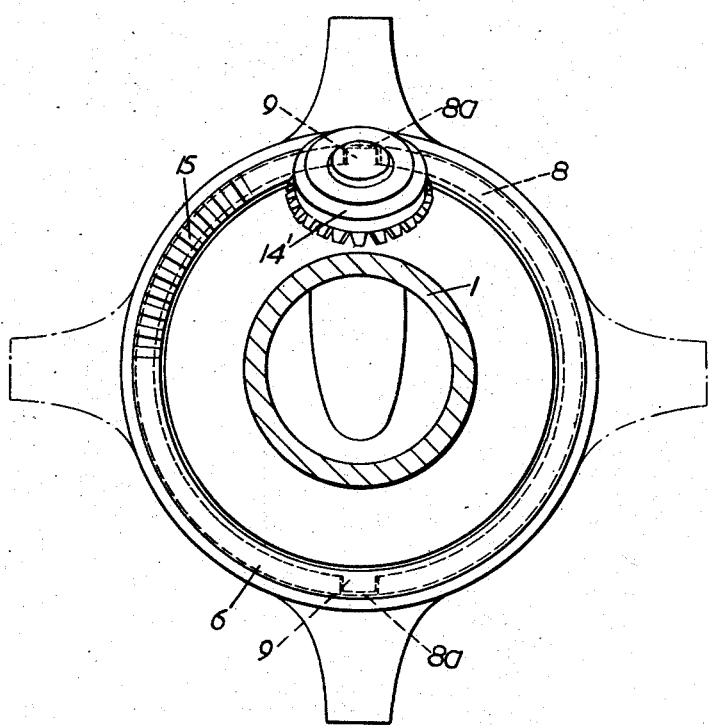

The invention is illustrated in the accompanying drawing as applied to the case in which each of two pipe end fittings to be connected is equipped with a closure valve: the drawing FIGURE 1 is a longitudinal sectional elevation showing the two end fittings presented to one another; FIGURE 2 is a view showing the end fittings parted from one another; and FIGURE 3 is an end elevation showing the relationship of certain parts.

Referring to the drawing, the two pipe end fittings, indicated generally at A, B are formed by hollow bosses 1, 2 which are enlarged to provide hollow cylindrical ends 3, 4 which, when presented together, define a valve chamber 5. On one of the ends 3 is mounted a ring 6 which is flanged at 7 at one end to engage behind a shoulder on that end 3; the other end of the ring 6 is formed with cam segments 8 to engage behind lugs 9 on the other cylindrical end 4, the segments 8 having gaps 8$^a$ which in one angular position of the ring register with the lugs 9 to permit the end fittings to be parted: such an arrangement is commonly used, the turning of the ring 6 resulting in the segment 8 passing behind the lugs 9 and then drawing the end fittings towards one another to make and to hold the connection between them.

The cylindrical ends 3, 4, which ends form the terminals of the end fittings, are provided flat faced heads or disc closures 10, 11. The discs are respectively carried by the ends of stub spindles 12, 13 which are mounted to turn in the walls of the enlargements 3, 4 about an axis at an angle to the axis of the end fitting. The two discs 10, 11 are located to one another by dowel pins 14 which enable the discs to be fitted to one another or parted when the coupling is to be broken.

Thus, when the two end fittings are presented to one another with the valve discs 10, 11 located by the dowel pins 14, the flat faces of the discs make face-to-face engagement and the two discs constitute a single valve mounted to turn with the two-part spindle 12, 13. Due to the inclination of the axis of the spindle 12, 13, the turning of the spindle moves the valve assembly 10, 11 from the closed position shown in full lines to the open position shown chain dotted lines in FIGURE 1.

Now, for the purpose of the present invention the movement of the valve is so controlled or operated by the movement of the locking ring 6 as to ensure that before the coupling can be broken (which requires the appropriate angular movement of the locking ring 6) the valve must be moved to its closing position.

This is achieved in the construction shown by fitting to the external end of the spindle 12 a bevel pinion 14′ to mesh with a partial ring of teeth 15 on the locking ring 6. In addition the cam segments 8 on the ring 6 are as is shown in FIGURE 3 so angularly disposed with reference to the partial ring of teeth 15 on the locking ring 6 that in the releasing operation of the ring, the teeth 15 being in mesh with the pinion 14′, turn the spindle 12 to the valve closing position (at which time the end of the partial ring of teeth registers with the pinion 14′ so discontinuing drive to the valve spindle) before the gaps 8$^a$ in the segments 8 commence to move into register with the lugs 9.

It will be obvious that the converse operation will occur, i.e. the movement of the locking ring 6 will first move the lugs 8, 9 into locking cooperation before its teeth 15 engage the teeth on the pinion 14′ to effect opening movement of the valve.

The discs 10, 11 could have peripheral sealing rings 16, 17 to make proper fluid tight engagement with the bore of the pipe ends: alternatively the edge of the disc could be plain and engage a sealing ring in a recess in the bore of the pipe ends.

While, as has been stated, a closure valve, i.e. the discs 10, 11, would be provided for both end fittings, in some cases, only one of the end fittings would require such a valve: in such a case only the end fitting A would be used, the other end fitting being of the form shown for the end fitting B but without the valve disc 11.

In the construction shown, the two enlarged cylindrical ends 3, 4 are provided with sealing rings 18, 19 cooperating with the locking ring 6: in other cases the ends can be formed to fit to one another in spigot and socket fashion with a sealing ring disposed between their faces.

It will be understood that the term "end fittings" is used in the accepted sense as including not only fittings which are to be applied to the ends of pipes (as is usually the case) but also where the ends of the pipes themselves are formed to constitute its own end connection.

What I claim is:

A pipe coupling comprising two pipe end fittings together providing a flow passage therethrough, said flow passage being defined at least in part by contiguous substantially cylindrical inner wall portions within the respective fittings; two substantially flat substantially circular valves, one mounted within each fitting and peripherally engageable with the substantially cylindrical inner wall portion thereof; means other than said valves and exterior of said fittings to connect the fittings together with said substantially cylindrical inner wall portions thereof forming continuations of each other on opposite sides of the connection between said fittings; means mounting said valve to turn on an axis at an angle oblique to said flow passage whereby turning of the valves on said axis will cause the valves to move from their peripherally engaged position on the wall of the flow passage to an open position parallel to the flow passage; and valve operating means operably connected to the means to connect the fittings and comprising a partial ring of teeth on the locking ring; and a pinion connected to said valve mounting means and being engageable by said partial ring of teeth only after said locking ring has been turned sufficiently to lock said fittings together, continued turning of said locking ring then rotating said pinion and opening said valves.

References Cited in the file of this patent
UNITED STATES PATENTS

| | | |
|---|---|---|
| 2,317,827 | Townhill | Apr. 27, 1943 |
| 2,712,454 | Love | July 5, 1955 |
| 2,948,553 | Gill et al. | Aug. 9, 1960 |

FOREIGN PATENTS

| | | |
|---|---|---|
| 708,527 | Great Britain | May 5, 1954 |